United States Patent Office.

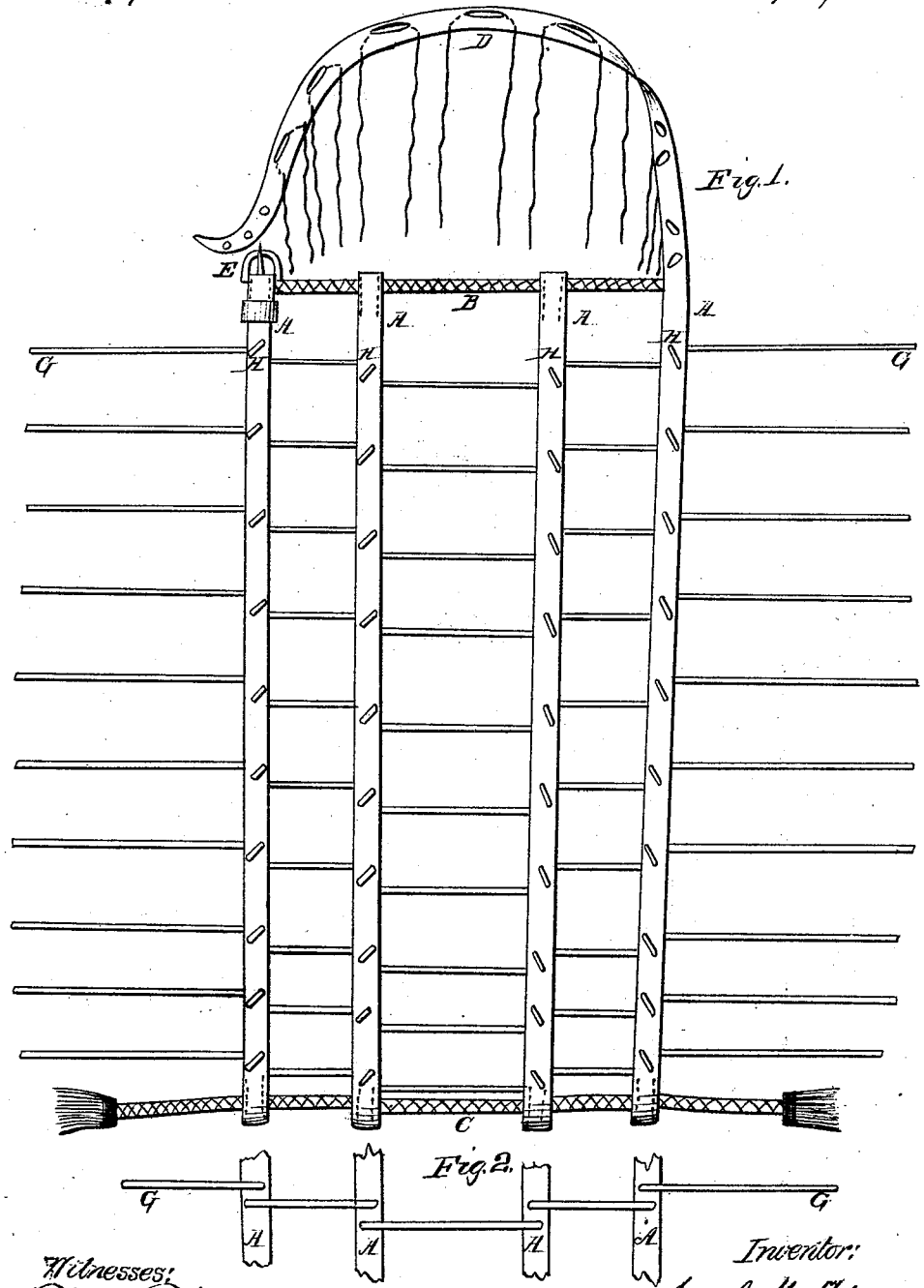

JACOB M. HARMAN, OF ORANGEVILLE, PENNSYLVANIA.

Letters Patent No. 99,434, dated February 1, 1870.

IMPROVEMENT IN FLY-NETS FOR HORSES.

The Schedule referred to in these Letters Patent and making part of the same

*To all whom it may concern:*

Be it known that I, JACOB M. HARMAN, of Orangeville, Columbia county, State of Pennsylvania, have invented an "Improved Fly-Net for Horses;" and I do hereby declare the following to be an exact description thereof, reference being had to the accompanying drawings, and to the letters of reference marked thereon, making a part of this specification, in which—

Figure 1 represents a top view of the fly-net, and

Figure 2, an under-side section of the same.

The nature of my invention consists in a fly-net composed of flat ribs, pierced with parallel holes, arranged diagonally across the rib, and lashes inserted in said holes, so as to form a diagonal stitch, in the manner described.

To enable others skilled in the art to make and use my invention, I will proceed to describe its construction, as follows:

A represents the ribs of the fly-net, that are made of flat strips of leather or any suitable material.

Their ends are connected by braided braces B and C, and ornamented with tassels.

D is a breast-piece, that is attached to the ribs by a buckle, E, or otherwise.

G are the lashes of the net, that are made of any suitable material, round or flat.

The one end of a lash is passed through the rib A from the lower side of the rib, and, crossing the rib on the upper side obliquely and diagonally, is passed down again through the rib, forming a perfectly oblique and diagonal stitch, H, (see fig. 1,) on the upper side of the rib, and forming, also, two oblique angles, and a half knot on the under side of the rib, as shown at fig. 2.

I do not claim the stitches of the lashes set parallel or at right angles with the rib, as they have been so made and used heretofore; but

What I claim as my invention, and desire to secure by Letters Patent, is—

A fly-net, composed of flat ribs, pierced with parallel holes, arranged diagonally across the rib, and lashes inserted in said holes, so as to form a diagonal stitch, in the manner described.

J. M. HARMAN.

Witnesses:
 H. C. EVES.
 F. P. BARKS.